(12) United States Patent
Tanaka

(10) Patent No.: US 7,676,370 B2
(45) Date of Patent: Mar. 9, 2010

(54) COMMAND-INPUTTING DEVICE HAVING DISPLAY PANEL

(75) Inventor: Hiroyuki Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 895 days.

(21) Appl. No.: 11/485,319

(22) Filed: Jul. 13, 2006

(65) Prior Publication Data

US 2007/0033055 A1 Feb. 8, 2007

(30) Foreign Application Priority Data

Jul. 21, 2005 (JP) ............................. 2005-211324
Apr. 20, 2006 (JP) ............................. 2006-116718

(51) Int. Cl.
G10L 15/22 (2006.01)
(52) U.S. Cl. ..................................... 704/270
(58) Field of Classification Search .................. 704/270
See application file for complete search history.

(56) References Cited

U.S. PATENT DOCUMENTS

| 4,862,498 | A * | 8/1989 | Reed ...................... 379/355.09 |
| 6,574,672 | B1 * | 6/2003 | Mitchell et al. ............. 709/250 |
| 6,697,894 | B1 * | 2/2004 | Mitchell et al. ............... 710/73 |
| 6,766,017 | B1 * | 7/2004 | Yang ...................... 379/355.02 |
| 6,988,990 | B2 * | 1/2006 | Pan et al. .................... 600/437 |
| 7,171,498 | B2 * | 1/2007 | Tu et al. ....................... 710/73 |
| 7,379,876 | B2 * | 5/2008 | Nakata ........................ 704/275 |
| 7,565,625 | B2 * | 7/2009 | Mullins et al. .............. 715/835 |
| 2003/0065515 | A1 | 4/2003 | Yokota |

FOREIGN PATENT DOCUMENTS

| JP | A-06-019659 | 1/1994 |
| JP | A-10-232917 | 9/1998 |
| JP | A-2001-282284 | 10/2001 |
| JP | A-2002-300642 | 10/2002 |
| JP | A-2003-029780 | 1/2003 |

\* cited by examiner

*Primary Examiner*—Susan McFadden
(74) *Attorney, Agent, or Firm*—Posz Law Group, PLC

(57) ABSTRACT

A device for inputting voice commands into a system such as a car navigation system includes a microphone for inputting voice commands, a display panel for displaying a help frame when required, a memory for storing a list of the voice commands and their respective usage frequencies in the past, and a controller for controlling operation of an entire system. A user confirms a voice command before inputting it, referring to a command list displayed on the display panel as a help frame. The command list shows all of the voice commands in a reverse order of their usage frequencies in the past. The commands which have not been frequently used and are not familiar to the user are shown in an earlier part of the list. Therefore, the commands for which confirmation are necessary can be quickly found in the list. Those commands which have been used in excess of a predetermined frequency level in the past may be eliminated from the list.

5 Claims, 6 Drawing Sheets

FIG. 3A

| | VOICE COMMANDS | USAGE FREQUENCY |
|---|---|---|
| 1 | PRESENT POSITION | 0 |
| 2 | ENTIRE DRIVING ROUTE | 0 |
| 3 | 2D | 0 |
| 4 | 3D | 0 |
| 5 | 2D TWIN | 0 |
| 6 | 3D TWIN | 0 |
| 7 | NORTH UP | 0 |
| 8 | HEADING UP | 0 |
| ⋮ | ⋮ | ⋮ |
| N-1 | MEMORIZED POINT WITH DIRECTION | 0 |
| N | MEMORIZED POINT WITH VOICE | 0 |

FIG. 3B

| | VOICE COMMANDS | USAGE FREQUENCY |
|---|---|---|
| 1 | PRESENT POSITION | 7 |
| 2 | ENTIRE DRIVING ROUTE | 0 |
| 3 | 2D | 2 |
| 4 | 3D | 1 |
| 5 | 2D TWIN | 3 |
| 6 | 3D TWIN | 0 |
| 7 | NORTH UP | 1 |
| 8 | HEADING UP | 5 |
| ⋮ | ⋮ | ⋮ |
| N-1 | MEMORIZED POINT WITH DIRECTION | 0 |
| N | MEMORIZED POINT WITH VOICE | 0 |

FIG. 4A　　FIG. 4B
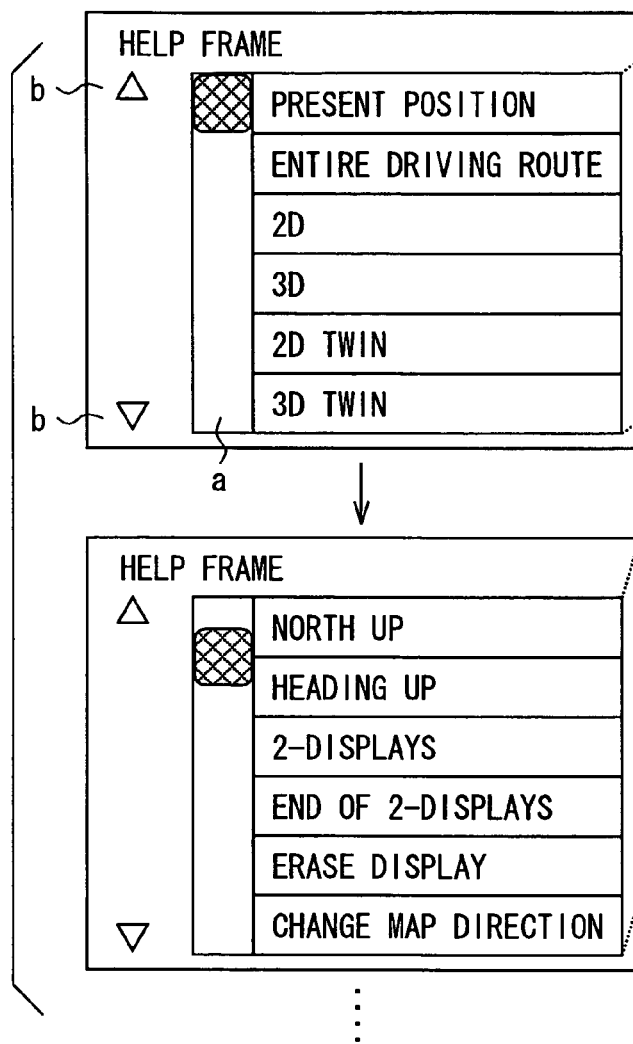

FIG. 6A
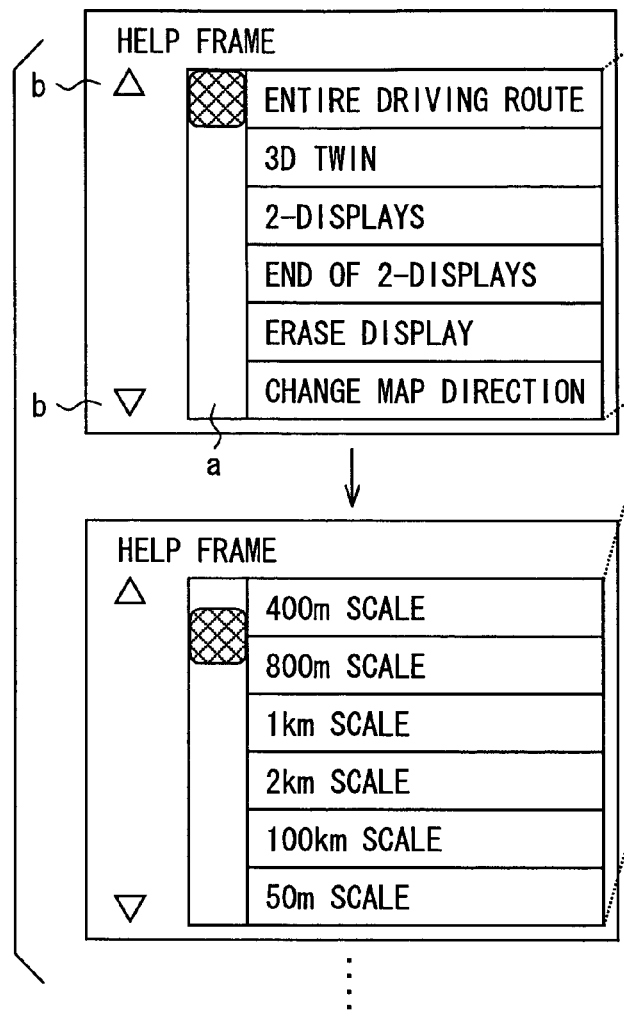
FIG. 6B
FIG. 7
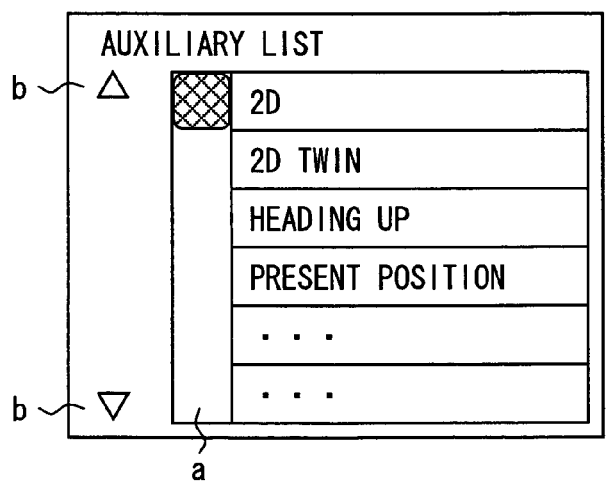

COMMAND-INPUTTING DEVICE HAVING DISPLAY PANEL

REFERENCE TO RELATED APPLICATION

This application is based upon and claims benefit of priority of Japanese Patent Applications No. 2005-211324 filed on Jul. 21, 2005 and No. 2006-116718 filed on Apr. 20, 2006, the contents of which are incorporated herein by reference.

BACKGROUND OF THE INVENTION

1. Field of the Invention

The present invention relates to a device for inputting commands to an electronic system such as a car navigation system.

2. Description of Related Art

Commands for operating a car navigation system are inputted from an inputting device including operating switches and a remote controller. Recently, voice commands have become to be used in addition to conventional commands. The voice commands are recognized by a voice recognizer included in the car navigation system. All of the voice commands are displayed on a display panel in a form of a help frame to be confirmed by a user. An example of this kind of display is shown in JP-A-2003-29780. A list showing all of the voice commands is displayed when a user selects "help for voice commands" in a menu. In the list, Chinese characters and pronunciation corresponding to respective voice commands are included.

Since the number of voice commands to be used is large (e.g., 200-300), it is impossible to display all of the voice commands at the same time. Therefore, the list showing the voice commands is shown in a scrolled manner. It is not easy, however, to search a desired command from the scrolled list. Voice commands that have been frequently used may become familiar to the user, and it may not be necessary for the user to search such voice commands for confirmation. In the conventional display, however, the voice commands including frequently used commands are all listed, making the search more difficult. This problem is involved not only in the car navigation system but also in other systems.

SUMMARY OF THE INVENTION

The present invention has been made in view of the above-mentioned problem, and an object of the present invention is to provide an improved command-inputting device, in which a desired command is easily searched in a list for confirming it before actually inputting the voice command.

The command-inputting device of the present invention such as a device for inputting voice commands is advantageously used in a car navigation system. The device for inputting voice commands includes an inputting device including a microphone and a voice recognition apparatus, a display device such as a liquid crystal display panel, a memory for memorizing a list of voice commands and their usage frequencies in the past, and controller controlling operation of an entire system.

When a user wants to input a voice command, the user pushes a help button to display a help frame showing a command list listing all of the voice commands on the display panel. All of the voice commands are listed in a reverse order of their usage frequencies (the reverse order of usage frequency means an order from low usage frequency to high usage frequency—this applies to all of the same expressions throughout the specification including claims). When the list includes too many voice commands to show on the display panel at the same time, the user scans the help frame to find a desired voice command. The user confirms the voice command he is going to input with reference to the command list displayed on the help frame. After confirming the desired voice command, the user inputs the correct voice command.

The voice commands that have been frequently used may not be necessary to be confirmed before inputting it, while the voice commands that have not been frequently used have to be confirmed with reference to the displayed help frame. Since the command list shows the voice commands in a reverse order of the usage frequency, the voice commands having a lower usage frequency are shown in the top portion of the list while the voice commands having a higher usage frequency are shown in a bottom portion of the list. Therefore, the user can find quickly the voice command to be confirmed in the list.

The voice commands which have been frequently used in the past, e.g., for a period of six months to one year counting from the present, may be eliminated from the list, because those voice commands are sufficiently familiar to the user and confirmation is not necessary. In addition, the rest of the voice commands may be listed in a reverse order of the usage frequency. In this manner, the voice command desired is further quickly searched in the list shown on the help frame. The commands to be inputted may not be limited to the voice commands, but other commands to be inputted from a keyboard or the like can be similarly confirmed.

Other objects and features of the present invention will become more readily apparent from a better understanding of the preferred embodiments described below with reference to the following drawings.

BRIEF DESCRIPTION OF THE DRAWINGS

FIG. 3A is an exemplary list showing voice commands and their usage frequencies in a default state (no usage frequency is memorized);

FIG. 3B is the same list as shown in FIG. 3A in a state where usage frequencies of respective voice commands are memorized;

FIG. 4A is a help frame showing a scrolled part of a list of voice commands;

FIG. 4B is a help frame showing an entire list of voice commands;

FIG. 6A is a help frame showing a scrolled part of a list of voice commands, in which voice commands excluding those having a high frequency are listed in a reverse order of usage frequency;

FIG. 6B is a help frame showing an entire list of voice commands, in which voice commands excluding those having a high frequency are listed in a reverse order of usage frequency; and FIG. 7 is an example of an auxiliary list showing voice commands having high usage frequencies.

DETAILED DESCRIPTION OF THE PREFERRED EMBODIMENTS

Figure 1:
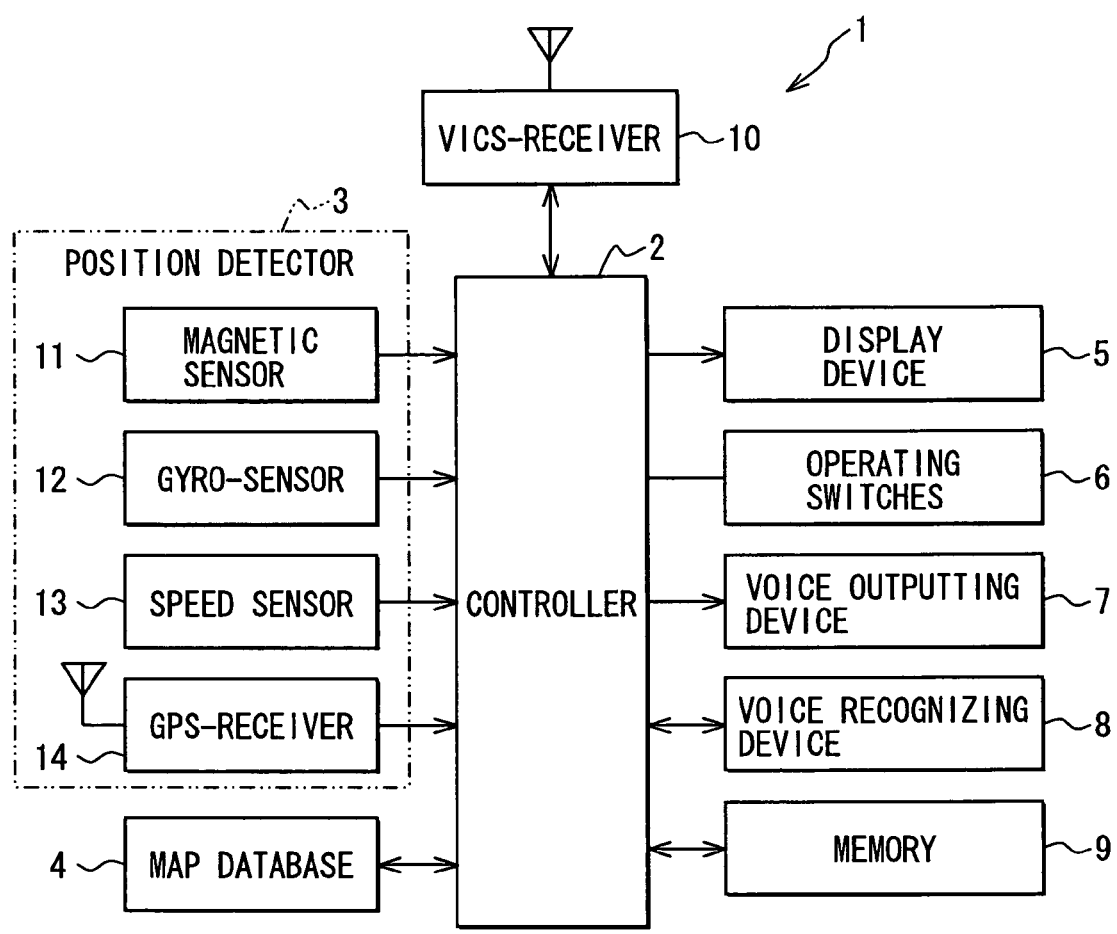
FIG. 1 is a block diagram showing an entire structure of a car navigation system including a command-inputting device.

A first embodiment of the present invention will be described with reference to FIGS. 1-5B. In this embodiment, the present invention is applied to a device for inputting voice commands to a car navigation system. First, referring to FIG. 1, an entire structure of the car navigation system will be described. The car navigation system 1 includes a controller 2 for controlling operation of the system, a position detector 3, a map database 4, a display device 5, operating switches 6, a voice outputting device 7, a voice recognizing device 8, a memory 9, and a VICS-receiver 10 (VICS is a registered trademark).

The controller 2 is constituted by a microcomputer including components (CPU, ROM, RAM, I/O interface, bus-lines, etc.). A navigation program is stored in a ROM, map data obtained from the map data base 4 and other data such as traffic information obtained through the VICS-receiver 10 are temporarily stored in a RAM. The position detector 3 is composed of components such as a magnetic sensor 11, a gyro-sensor 12, a speed sensor 13, a GPS-receiver 14. The position detector 3 detects a present position of a vehicle. The map database 4 is composed of large capacity memories such as CD-ROMs, DVD-ROMs or a hard disc. Various data such as: data for displaying maps; road data for map-matching, route-searching and route-guidance; intersection data showing details of intersections; data for showing backgrounds; and names of places including telephone numbers are all stored in the map database 4.

The display device 5 may include a color liquid-crystal display panel, and is positioned in the vicinity of a driver's seat. On the display panel, road maps are displayed in variable scales. A present position of the vehicle and a pointer showing a driving direction are shown on the display panel, overlapping the road map. A driving route is also shown on the displayed map according to requirement of a user. In addition, a menu frame for inputting a destination, information frames showing various messages and help frames are shown on the display panel according to requirement of the user.

The operating switches 6 includes mechanical switches positioned near the display device and touch-panel switches formed on the display panel. The operating switches are used for inputting various commands and data to the controller 2. The voice outputting device 7 composed of a voice synthesizer, an amplifier and a speaker generates voice outputs according to voice information fed from the controller 2. The voice recognizing device 8 includes a microphone, a voice abstractor for converting voices inputted from the microphone to digital data, and a voice recognizer including a dictionary having comparing voice patterns. The voice recognizing device 8 feeds recognized voice data to the controller 2. The memory 9 composed of rewritable non-volatile memories such as flash memories stores data and information including usage frequencies of the voice commands.

The VICS-receiver 10 is composed of a VICS sensor unit, an FM receiver for multiple-broadcasts and other components. The VICS-receiver 10 feeds traffic information, which is sent from a VICS station by means of light or beacon and received by the VICS sensor unit, and other traffic information received by the FM receiver to the controller 2. The controller 2 performs various functions which are necessary in operating the car navigation system. The controller 2 displays maps on the display panel according to commands inputted through the operating switches 6 and the voice recognizing device 8. It calculates a driving route, generates route guidance information, and performs various searches including telephone numbers, postal codes, MAP-CODES (a registered trademark), a phonetic search, a genre search, and a nearby facility search. It also registers destinations and places to be memorized, and performs other functions necessary for assisting a driver. A help frame showing a list of voice commands is displayed on the display panel under control of the controller 2.

Figure 2:
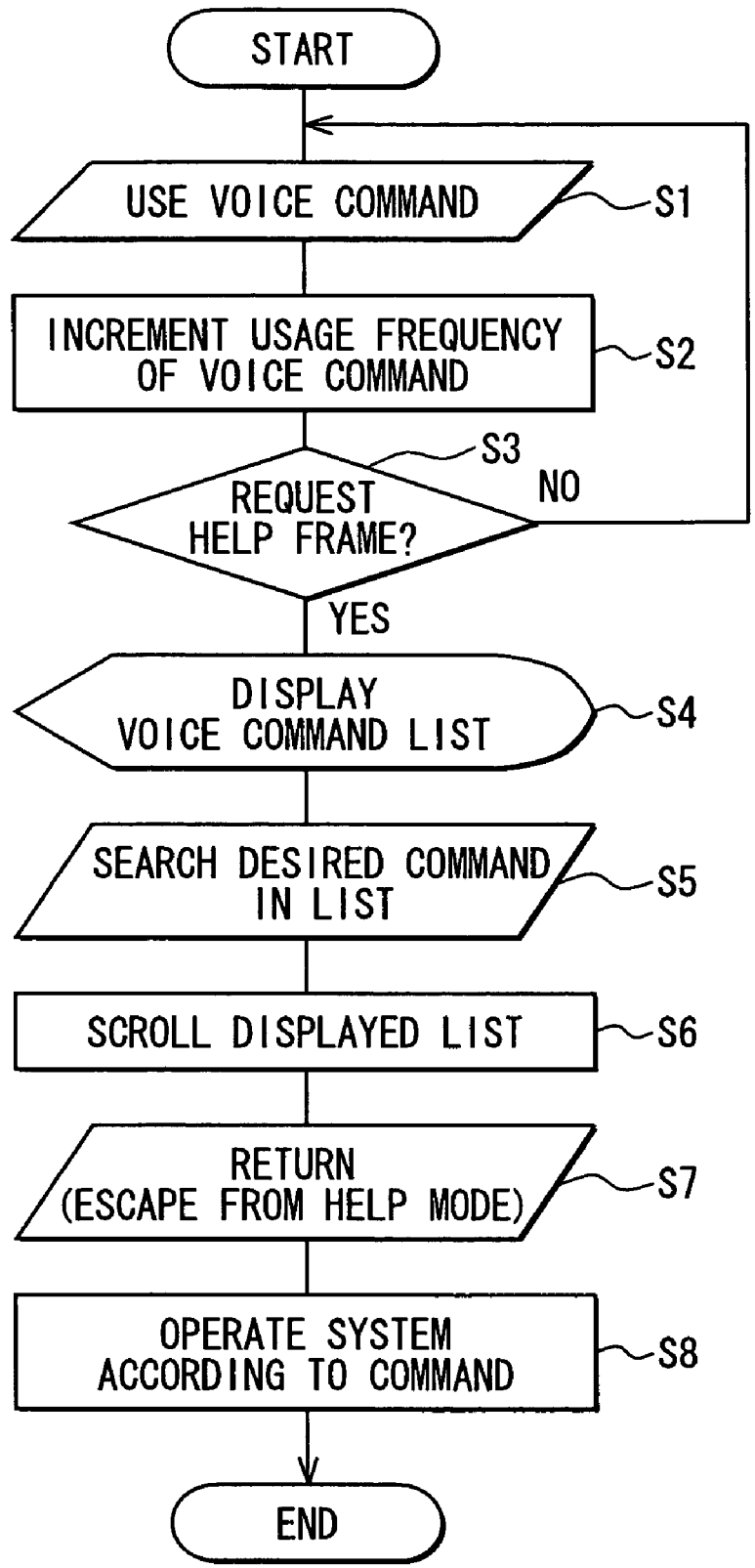
FIG. 2 is a flowchart showing a process of searching a desired voice command.
Figures 5A, 5B:
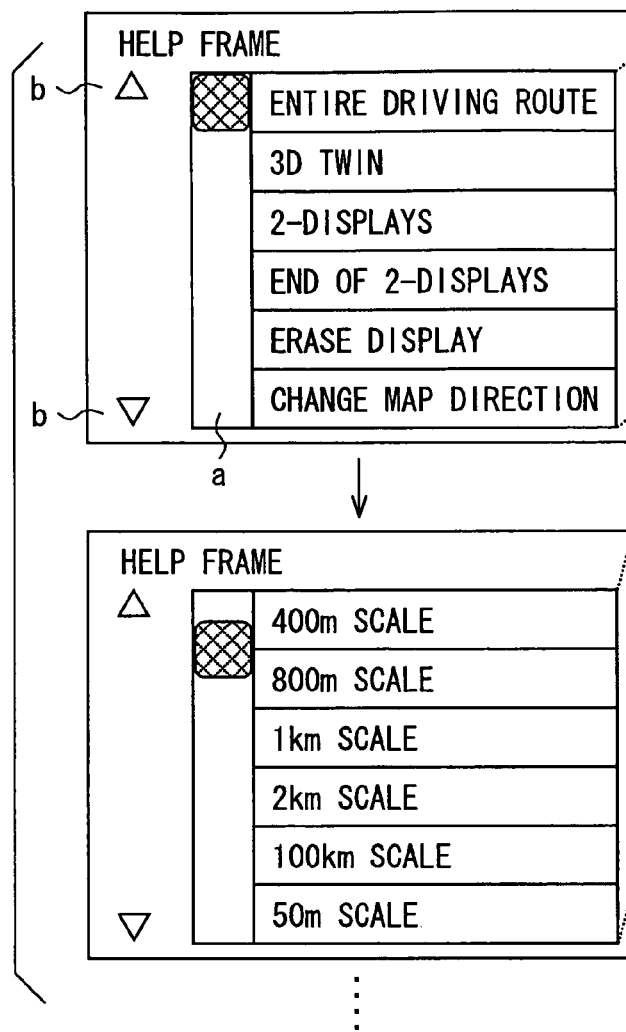
FIG. 5A is a help frame showing a scrolled part of a list of voice commands, in which the voice commands are listed in a reverse order of usage frequency.
FIG. 5B is a help frame showing an entire list of voice commands, in which the voice commands are listed in a reverse order of usage frequency.

Now, a process of searching a voice command will be described with reference to a flowchart shown in FIG. 2 and lists of voice commands shown in FIGS. 3A-5B. At step S1 (FIG. 2), a user speaks a voice command toward a microphone of the voice recognizing device 8. Then, the process proceeds to step S2, where usage frequencies of the voice commands memorized in a format stored in the memory 9 are incremented. That is, the voice commands listed in a format shown in FIG. 3A in a default state (usage frequencies of all of the voice commands are zero) is converted to a format shown in FIG. 3B (usage frequencies of voice commands are shown). Then, the process proceeds to step S3, where whether the user requests for "help" or not is checked. That is, if the user says "help" the process proceeds to step S4, where a command list shown in FIG. 4B is displayed on the display panel (a command list shown in FIG. 5B is actually displayed as explained later). If the user does not request for "help", the process returns to step S1.

FIG. 4B shows a command list in a default state, where all of the voice commands are listed in an original order (the same order in FIGS. 3A and 3B). Since the command list includes so many voice commands (e.g., 200-300), it is impossible to display all of them on the panel at once. Therefore, the command list is scrolled to show its portion on the panel as a help frame shown in FIG. 4A. By touching a scroll bar "a" or a scroll button "b" on the help frame, all of the voice commands can be scanned.

At step S5 (FIG. 2), the user searches a desired voice command on the help frame. For this purpose, the user scrolls the help frame at step S6. After the user confirmed the desired voice command on the help frame, the user pushes a "return" button to finish the help mode and to proceed to the next step S8. At step S8, the user inputs the confirmed voice command through the microphone to operate the system according to the inputted voice command. Then, the process comes to the end.

As mentioned above, the help frame displayed at step S4 is the frame converted from the list shown in FIG. 4B to the list in FIG. 5B. In FIG. 5B, the voice commands are shown in a reverse order of usage frequency. That is, a voice command "entire driving route" having a usage frequency zero (as shown in FIG. 3B) is shown at the top of the list, while a voice command "present position" having a usage frequency 7 (as shown in FIG. 3B) is shown at the bottom of the list. Since the all of the voice command shown in FIG. 5B cannot be displayed on the panel at the same time, it is scrolled to shown part by part as the help frames as shown in FIG. 5A.

As described above, the voice commands are displayed in a reverse order of usage frequency in the help frame shown in FIG. 5A. This means that the voice commands which are not necessary to be confirmed because they are familiar to the user due to frequent usage are shown at the bottom portion of the list, while the voice commands which have to be confirmed are listed at the top portion of the list. Accordingly, the user can find a voice command to be confirmed quickly in an earlier part of the scrolled list.

A second embodiment of the present invention will be described with reference to FIGS. 6A, 6B and 7. In this embodiment, voice commands frequently used in the past are eliminated from the list to reduce the number of voice commands displayed in the help frame to make the confirmation further easier. In FIG. 6B, an example of command list, in which voice commands having 2 or higher usage frequency are eliminated, is shown. As exemplified in FIG. 3B, the voice commands, "present position", "2D", "2D twin" and "heading up" have 2 or higher usage frequency, respectively. Therefore, they are eliminated from the list shown in FIG. 6B. The list shown in FIG. 6B is scrolled, and help frames shown in FIG. 6A are displayed. Since the voice commands familiar to the user are eliminated from the list, the user can search a desired voice command further quickly in the help frame. It is preferable that the voice commands are shown in a reverse order of usage frequency in this embodiment, too. Other structures of the second embodiment are the same as those of the first embodiment.

An auxiliary list shown in FIG. 7 that lists the voice commands eliminated from the list shown in FIG. 6B is stored in the memory 9, so that the auxiliary list can be displayed according to a user's request. The user can refer to the auxiliary list whenever necessary.

The present invention is not limited to the embodiments described above, but it may be variously modified. For example, the usage frequency may be memorized only for a predetermined period (e.g., six months or one year) counted from the present time. Since old memories of the usage frequency are erased in this modified form, those voice commands frequently used in the past but not used these days are listed at an early part of the help frame. In this manner, the voice commands, familiarity to which is deteriorated, can be easily confirmed in the help frame.

The present invention may be applied to various systems other than the car navigation system, in which confirmation of commands to be inputted (by voice or keyboards) is desirable. Such confirmation can be made by referring to the help frame. It may not be necessary to scroll the list if the number of commands listed there is not large.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A device for inputting commands for operating a system, the device comprising:
    means for inputting commands;
    a display device for displaying a list showing commands to be used for operating the system;
    memory means for memorizing usage frequencies of respective commands; and
    a controller for controlling the display device so that the commands are displayed after eliminating those commands, the usage frequency of which is higher than a predetermined level,
   wherein:
    an auxiliary list listing the eliminated commands is stored in the memory means and is displayed on the display device according to a user's request.

2. The device as in claim 1, wherein: the commands are voice commands inputted through a voice recognizer.

3. The device as in claim 1, wherein:
    the commands are displayed in a scrolled manner on the display device.

4. The device as in claim 1, wherein:
    the usage frequency of the respective commands during a last predetermined period of time is stored in the memory means.

5. The device as in claim 1, wherein:
    the commands are displayed in a reverse order of the usage frequency.

* * * * *